US011249790B1

(12) United States Patent
Gupta et al.

(10) Patent No.: US 11,249,790 B1
(45) Date of Patent: Feb. 15, 2022

(54) SCHEDULING USAGE OF OVERSUBSCRIBED COMPUTING RESOURCES

(71) Applicant: Amazon Technologies, Inc., Seattle, WA (US)

(72) Inventors: Diwakar Gupta, Seattle, WA (US); Alexey Gadalin, Kirkland, WA (US); Ethan John Faust, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 148 days.

(21) Appl. No.: 16/816,042

(22) Filed: Mar. 11, 2020

(51) Int. Cl.
*G06F 9/455* (2018.01)
*G06F 9/48* (2006.01)
*G06F 9/50* (2006.01)

(52) U.S. Cl.
CPC ........ *G06F 9/45558* (2013.01); *G06F 9/4881* (2013.01); *G06F 9/5005* (2013.01); *G06F 2009/4557* (2013.01); *G06F 2009/45583* (2013.01); *G06F 2009/45591* (2013.01); *G06F 2209/5019* (2013.01)

(58) Field of Classification Search
None
See application file for complete search history.

(56) References Cited

U.S. PATENT DOCUMENTS

| | | | |
|---|---|---|---|
| 8,825,550 B2 * | 9/2014 | Marr | H04L 43/16 705/52 |
| 9,135,048 B2 | 9/2015 | Klein et al. | |
| 9,250,863 B1 * | 2/2016 | Vincent | G06F 8/10 |
| 9,348,646 B1 * | 5/2016 | Daya | G06F 9/4856 |
| 9,350,682 B1 * | 5/2016 | Gupta | G06F 9/45558 |
| 9,417,902 B1 * | 8/2016 | Noonan | G06F 9/5038 |
| 9,606,826 B2 * | 3/2017 | Ghosh | G06F 9/4856 |
| 9,606,828 B2 * | 3/2017 | Ghosh | G06Q 10/0631 |
| 9,870,268 B2 * | 1/2018 | Dippenaar | G06F 9/5088 |
| 10,015,241 B2 * | 7/2018 | Marr | H04L 67/1008 |

(Continued)

OTHER PUBLICATIONS

Sun et al. "ROSE: Cluster Resource Scheduling via Speculative Over-subscription", 2018 IEEE, pp. 949-960.*

(Continued)

*Primary Examiner* — Van H Nguyen
(74) *Attorney, Agent, or Firm* — Knobbe Martens Olson & Bear, LLP

(57) ABSTRACT

Generally described, one or more aspects of the present application relate to an instance resource oversubscription service for scheduling a burst period for a running virtual machine instance based on a time window specified by a user of the virtual machine instance. For example, the instance resource oversubscription service can predict future resource usage and identify the appropriate timing and physical host machine for letting the user burst (e.g., temporarily use the virtual machine instance in a manner than consumes a higher amount of computing resources such as CPU cycles, memory, network bandwidth, etc.). In doing so, the instance resource oversubscription service may consider, for example, the historical and current resource utilization levels of the virtual machine instances running on a set of available physical host machines and the burst period scheduling requests from other users of the instance resource oversubscription service.

20 Claims, 7 Drawing Sheets

(56) References Cited

U.S. PATENT DOCUMENTS

| | | | | |
|---|---|---|---|---|
| 10,394,590 B2* | 8/2019 | Ghosh | ............ | H04L 41/0826 |
| 10,409,630 B2* | 9/2019 | Ghosh | ............ | G06F 9/45558 |
| 10,489,208 B1* | 11/2019 | Noonan | ............ | G06F 9/5038 |
| 10,678,603 B2* | 6/2020 | Bianchini | ............ | G06F 9/45558 |
| 2019/0310880 A1 | 10/2019 | Gupta et al. | | |

OTHER PUBLICATIONS

Chen et al. "Improving Cluster Resource Efficiency with Oversubscription", 2018 IEEE, pp. 144-153.*

* cited by examiner

SCHEDULING USAGE OF OVERSUBSCRIBED COMPUTING RESOURCES

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, set up with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

DETAILED DESCRIPTION

Introduction

Figure 1:
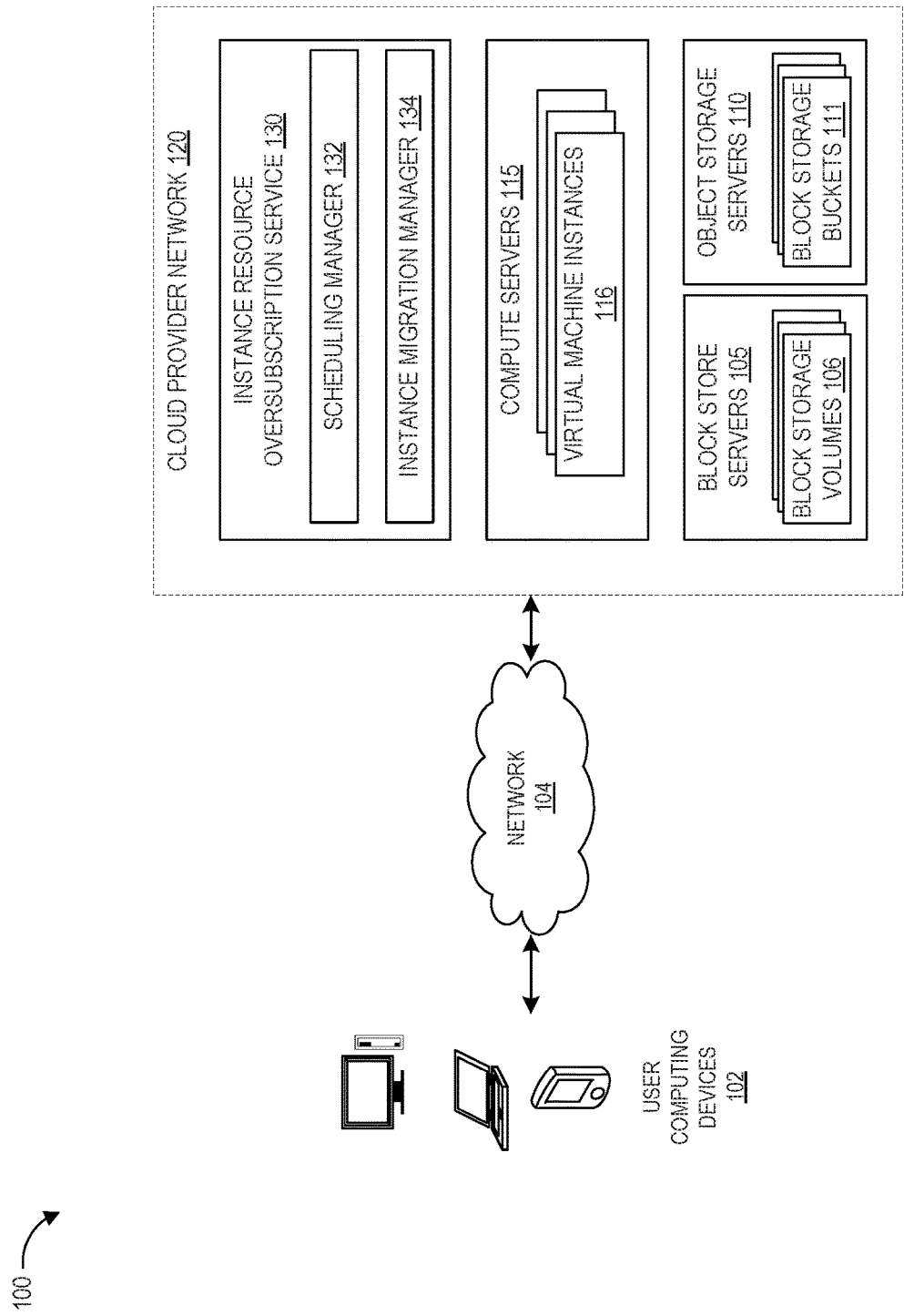
FIG. 1 depicts a schematic diagram of a network environment in which a cloud provider network is used to implement an instance resource oversubscription service in accordance with aspects of the present disclosure.

Generally described, aspects of the present disclosure relate to methods, systems, and processes for improving resource utilization (e.g., reducing over-utilization) by virtual machines provided by a networked distributed computing system, such as a cloud provider network. The techniques described herein may include allowing a user of a virtual machine provided by a cloud provider network to submit a request to utilize additional computing resources on the virtual machine for a duration within a future time window of the user's choice, and scheduling, within the future time window specified by the user, a time period (also referred to herein as a burst period) during which the virtual machine can consume a higher amount of computing resources.

In some implementations, all of the computing resources allocated to a given virtual machine are available to the virtual machine at all times, and the user need not worry about whether or not a particular task running on the virtual machine may not be provided the necessary resources. However, in other implementations, multiple virtual machines may be hosted on the same physical host machine, and the resources of the physical host machine may be oversubscribed such that the sum of the amount of resources allocated to each virtual machines hosted by the physical host machine would exceed the total amount of resources available on the physical host machine. For example, virtual machines having complementary resource usage profiles (e.g., one that uses a lot of resources during the day, and another that uses a lot of resources at night) may be placed on the same physical host machines. In such implementations, if some virtual machines on the physical host machine unexpectedly consume a lot of resources (e.g., in a manner not consistent with their normal resource usage profiles or with prior resource usage history), the resource usage of other virtual machines on the same physical host machine may be limited or throttled. The unpredictability of whether a requested amount of resources would be provided may degrade the user experience for oversubscribed virtual machines. Thus, an improved method of increasing the likelihood of getting the requested computing resources on such oversubscribed virtual machines is desired.

The presently disclosed technology addresses these deficiencies by providing a usage spike alerting service of cloud provider network that can use information about future usage spikes to proactively migrate resources, thereby mitigating the impact of oversubscription and usage spikes on other resources running on the host. For example, the usage spike alerting service can allow a user of a virtual machine (also referred to herein as virtual compute instances, virtual computing devices, virtual machine instances, or simply instances) provided by the cloud provider network to submit a request to utilize additional computing resources on the virtual machine for a duration within a future time window of the user's choice, and schedule, within the future time window specified by the user, a time period (also referred to herein as a burst period) during which the virtual machine can consume a higher amount of computing resources. To illustrate, the user may expect that the load on their application will increase at some specific future period due to an impending deadline, a planned marketing campaign, based on information from their own end users, or other reasons. This provides the service with explicit information indicating a time and amount of a future spike in resource usage by the instance, which can be used to determine if the instance should be migrated to a new host proactively before the spike. As another example, the usage spike alerting service can predict (based on historical usage data, or using a machine learning model) when the instance will have a spike in the future, and can perform migration as needed based on such a prediction.

By allowing the users to specify a time window during which they would like to burst (i.e., temporarily use a higher amount of computing resources such as CPU cycles) and therefore knowing when the users would burst in advance, the cloud provider network can plan ahead and better coordinate the demands of the virtual machines within the cloud provider network, thereby improving the likelihood that a given virtual machine will have access to the desired amount of computing resources at least during the burst period scheduled within the time window specified by the user.

In some cases, the cloud provider network may determine that the virtual machine, in order to have access to a sufficient amount of computing resources during the burst period, should be moved to another physical host machine that is less crowded or less utilized. In such cases, the cloud provider network may move the virtual machine to the new physical host machine before the scheduled burst period. In this manner, the cloud provider can implement proactive migration to move the instance before the usage spike, rather than reactive migration that moves the instance after the usage spike is observed. Beneficially, such proactive migration avoids imposing any migration-related availability interruptions on the customer's workload during its burst period, instead using migration before the burst occurs.

The requests to schedule a burst period (e.g., a period during which the virtual machine can "burst", or a period during which the user of the virtual machine anticipates increased resource usage by the virtual machine) can be provided to the cloud provider network as, for example, one or more application programming interface ("API") calls. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

As will be appreciated by one of skill in the art in light of the present disclosure, the embodiments disclosed herein improve the ability of computing systems, such as virtual compute systems, to provide mechanisms for requesting additional computing resources for a future time window so that such a system can better coordinate workloads across physical host machines to improve load balancing and resource utilization. By allowing users of virtual machines to specify future time windows during which they would like to burst (as opposed to allowing the users to burst whenever they want or without any notice), the system can identify the time (e.g., within the time windows specified by the users) and location (e.g., particular physical host machines that can accommodate the requested bursting) in advance of the requested bursting in a manner that would improve resource availability and therefore user experience.

Prior techniques generally relied on either charging the users for bursts or disabling bursts beyond a threshold level (e.g., by preventing the average resource usage from exceeding a predetermined baseline level of usage). However, such approaches do not allow the cloud provider network to make any adjustments (e.g., move the virtual machines to different physical host machines, move up or postpone the timing of the burst depending on current and predicted resource usage, etc.) to improve the resource availability to the virtual machines.

In contrast, embodiments of the present disclosure enable users to, in advance of bursting, specify a future time window during which the cloud provider network has the flexibility to schedule a burst period, thereby allowing the cloud provider network some lead time and temporal flexibility (e.g., allowing the cloud provider network to schedule the burst period between a time window, as opposed to demanding additional computing resources right away without any warning) to make the necessary adjustments to improve the likelihood that the requested resources would be available.

The presently disclosed embodiments therefore address technical problems inherent within computing systems, such as the difficulty of predicting the resource usage patterns of virtual machines hosted on physical host machines of the cloud provider network. These technical problems are addressed by the various technical solutions described herein, including providing a mechanism to specify future time windows during which the bursts are to occur, moving the virtual machines to different physical host machines, and scheduling the burst periods to improve resource availability. Thus, the present disclosure represents an improvement on existing virtual compute systems, and computing systems in general.

These and other aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting.

Overview of Example Computing Environment for Instance Resource Oversubscription Service FIG. 1 depicts an example computing environment 100 including a cloud provider network 120 in which the disclosed instance resource oversubscription service can be implemented. A cloud provider network (sometimes referred to as a cloud provider system or simply a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud provider network 120. Cloud computing can thus be considered as both the applications delivered as services over a publicly accessible network (e.g., the Internet, a cellular communication network) and the hardware and software in cloud provider data centers that provide those services. It will be appreciated that the disclosed burst period scheduling techniques may be implemented in non-elastic computing environments as well.

The cloud provider network 120 can be accessed by user computing devices 102 over a network 104. The cloud provider network 120 includes an instance resource oversubscription service 130, one or more compute servers 115, one or more block store servers 105, and one or more object storage servers 110 that are in networked communication with one another and with the network 104 to provide users with on-demand access to computing resources including instances 116, volumes 106, and buckets 111, among others. These particular resources are described in further detail below. Some implementations of cloud provider network 120 can additionally include domain name services ("DNS") servers, relational database servers, and other server configurations (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The instance resource oversubscription service 130 may provide a set of APIs that can be used by the users of the user computing devices 102 to submit a request to schedule a burst period during which an additional amount of computing resources is to be made available for use by the virtual machine instances of the users. In response to API calls from the user computing devices 102, the instance resource oversubscription service 130 may determine the predicted resource usage (e.g., based on historical resource usage patterns, scheduled future resource usage, or both) and schedule the burst period according to the predicted resource usage.

In the example of FIG. 1, the instance resource oversubscription service 130 includes a scheduling manager 132 and an instance migration manager 134. The scheduling manager 132 may receive the burst request from the user computing device 102 specifying a time window during which the user would like to burst the instance 116, determine the predicted resource usage, schedule the burst period according to the predicted resource usage, and output an indication to the user computing device 102 that the burst period has been scheduled. The instance migration manager 134 may migrate the instance 116 to another physical host machine if the current physical host machine is expected to be crowded or busy during the time window requested by the user computing device 102. The operations of the instance resource oversubscription service 130 are described in greater detail below with reference to FIGS. 2-6.

Although the cloud provider network 120 includes the instance resource oversubscription service 130 in the example of FIG. 1, in other embodiments, the instance resource oversubscription service 130 is a logical components shown for the purpose of illustration, and the operations described as being performed by the instance resource oversubscription service 130 (or the components thereof) can be performed instead by one or more other components of cloud provider network 120 (e.g., the compute servers 115).

The cloud provider network 120 can provide on-demand, scalable computing platforms to users through the network 104, for example allowing users to have at their disposal scalable "virtual computing devices" via their use of the block store servers 105, object storage servers 110, and compute servers 115. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 120 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability. The scheduling of burst periods and the moving of virtual machine instances described herein may be performed within the same regions or available zone or across multiple regions or available zones.

Turning specifically to the roles of the different servers within the cloud provider network 120, the compute servers 115 include one or more servers on which provide resizable computing capacity to users for building and hosting their software systems. The compute servers 115 and associated control plane functionality can provide an elastic compute cloud service of the cloud provider network. The traffic and operations of the cloud provider network may broadly be subdivided into two categories in various embodiments:

control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/ distinct networks.

Compute resources can be provided from the compute servers 115 to customers via an elastic compute cloud service (referred to in various implementations as an elastic compute service, a virtual machines service, a computing cloud service, a compute engine, or a cloud compute service). Users can use the compute servers 115 to launch as many virtual computing environments, referred to as virtual compute instances, virtual machine instances, virtual machines, or "instances" 116, as they need. Instances 116 can have various configurations of processing power, memory, storage, and networking capacity depending upon user needs. The compute servers 115 can also include computer storage for temporary data used while an instance is running, however as soon as the instance is shut down this data is lost.

The cloud provider network 120 may offer virtual computes with varying computational and/or memory resources. In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/ or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some embodiments, migration can be used to ensure that the resources needed to accommodate the bursting by the virtual machine instance are available at the time of bursting. Migration refers to moving virtual machine instances (and/or other resources) between hosts (also referred to herein as physical host machines) in a cloud computing network, or between hosts outside of the cloud computing network and hosts within the cloud. There are different types of migration including live migration and reboot migration. Techniques for various types of migration involve managing the critical phase—the time when the virtual machine instance is unavailable to the customer— which should be kept as short as possible.

During a reboot migration, the customer experiences an outage and an effective power cycle of their virtual machine instance. For example, a control plane service can coordinate a reboot migration workflow that involves tearing down the current instance on the original host (the "source host") and subsequently creating a new virtual machine instance on the new host (the "target host"). The instance is rebooted by being shut down on the original host and booted up again on the new host.

Live migration refers to the process of moving a running virtual machine instance between different physical machines without significantly disrupting the availability of the virtual machine instance (e.g., the down time of the virtual machine instance is not noticeable by the end user). When the control plane initiates a live migration workflow it can cause the creation of a new "inactive" domain associated with the instance on a target host, while the original domain for the instance continues to run as the "active" domain (e.g., the destination or address at which the virtual machine can be accessed) on the source host. Memory (including any in-memory state of running applications), storage, and network connectivity of the virtual machine are transferred from the original host with the active domain to the destination host with the inactive domain. For example, a local migration manager running on the source can send memory pages to the target host (also referred to as the "state" of the instance), track changes to the memory pages, and continue sending the changed pages to the target host. The instance may be briefly paused to prevent state changes while transferring a final set of memory contents to the target host. Thereafter, one or more of the control plane, the local migration manager, and the hypervisors (on the source and target hosts) can transition the inactive domain to become the active domain and demote the original active domain to become the inactive domain (sometimes referred to as a "flip"), after which the instance begins running on the target host, and the inactive domain can be discarded. Additional details relating to virtual machine instance migration are provided in U.S. application Ser. No. 16/442,325 (U.S. Pat. App. Pub. No. 2019/0310880), titled "MANAGED ORCHESTRATION OF VIRTUAL MACHINE INSTANCE MIGRATION," which is incorporated herein by reference in its entirety.

Turing to additional resources that can be utilized by the virtual machine instances 116, the block store servers 105 provide persistent data storage for the compute servers 115 in the form of volumes 106, each of which represents a virtualized, network-accessible block-storage device (e.g., a virtual "hard disk"). The block store servers 105 and associated control plane functionality can provide an elastic block store service of the cloud provider network. Block storage services can be referred to as a cloud disk service, managed disk service, storage area network service, persistent disk service, or block volume service, in various implementations. The block store servers 105 include one or more servers on which data is stored as blocks. A block is a sequence of bytes or bits, usually containing some whole number of records, having a maximum length of the block size. Each block is assigned a unique identifier by which it can be stored and retrieved, but typically is not assigned metadata providing further context. A block of data (also referred to herein as a "data block") can be, for example, 512 bytes, 1 kilobyte ("kB"), 4 kB, 8 kB, 16 kB, 32 kB, 64 kB, 128 kB, 256 kB, 512 kB, or larger, depending upon the implementation.

The block storage volumes 106, which can be treated as an individual hard drive ranging for example from 1 GB to 1 terabyte TB (or more) in size, are made of one or more blocks stored on the block store servers 105. These volumes provided persistent, dedicated storage that can be attached to particular instances of the compute servers 115. Each volume may be attached to a single instance running on a compute server 115, and can be detached from that instance and re-attached to another. The block store servers 105 may have built-in redundancy for volumes by replicating the volume across multiple servers within an availability zone, which means that volumes will not fail if an individual drive fails or some other single failure occurs.

The object storage servers 110 represent another type of storage within the cloud provider network 120. The object storage servers 110 and associated control plane functionality can provide an object-based storage service of the cloud provider network. Object-based storage services can be referred to as a blob storage service, cloud object storage service, or cloud storage service, in various implementations. The object storage servers 110 include one or more servers on which data is stored as objects within resources referred to as buckets 111. Each object typically includes the data being stored, a variable amount of metadata that enables various capabilities for the object storage servers 110 with respect to analyzing a stored object, and a globally unique identifier or key that can be used to retrieve the object. Objects stored on the object storage servers 110 are associated with a unique identifier, such that authorized access to them can be obtained through requests from networked computing devices in any location.

Each bucket 111 is associated with a given user account. Users can store as many objects as desired within their buckets, can write, read, and delete objects in their buckets, and can control access to their buckets and the objects contained therein. For example, the instances 116 may access the buckets 111 to write, read, or delete the objects contained therein. Further, in embodiments having a number of different object storage servers 110 distributed across different ones of the regions described above, users can choose the region (or regions) where a bucket is stored, for example to optimize for latency. Users can use object storage servers 110 for purposes such as storing photos on social media websites, songs on music streaming websites, or files in online collaboration services, to name a few examples. Applications developed in the cloud often take advantage of the vast scalability and metadata characteristics of the object storage servers 110. The object storage servers 110 can support highly parallel data accesses and transfers.

The object storage servers 110 can offer even greater redundancy than the block store servers 105, as the object storage servers 110 can automatically replicate data into multiple availability zones. The object storage servers 110 also have different data throughput than the block store servers 105, for example around 20 Mbps for a single stream of data. While the object storage servers 110 can be used independently from the instances 116 and volumes 106 described above, they can also be used to provide data backup (e.g., object-stored backups of volume data).

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. User computing devices 102 can include any network-equipped computing device, for example desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

Example Configurations of Virtual Machines and Physical Host Machines

Figure 2:
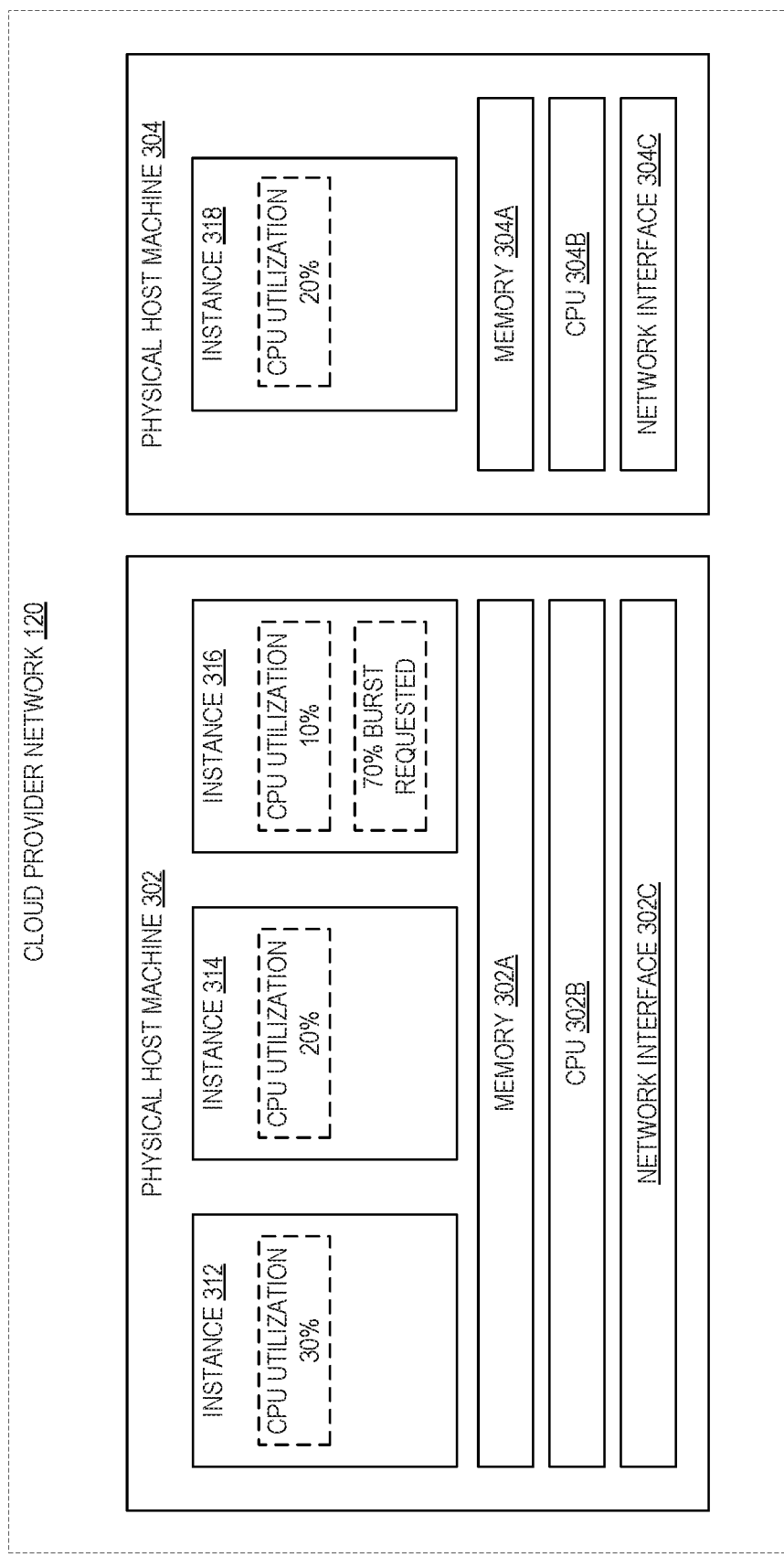
FIG. 2 depicts a block diagram of an embodiment in which a virtual machine instance has a pending request to burst in accordance with aspects of the present disclosure.
Figure 3:
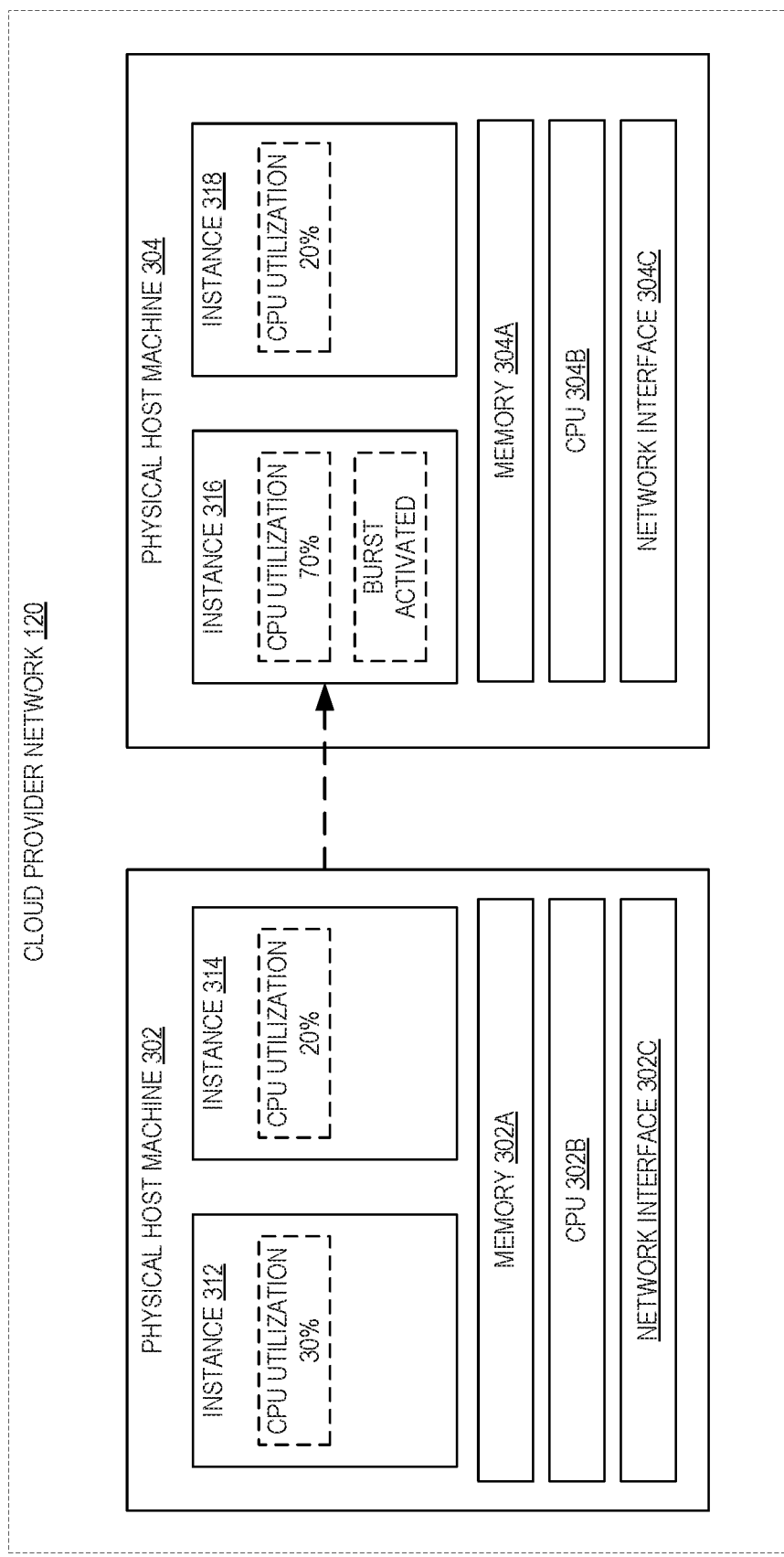
FIG. 3 depicts a block diagram of an embodiment in which the virtual machine instance of FIG. 2 is currently bursting in accordance with aspects of the present disclosure.
Figure 4:
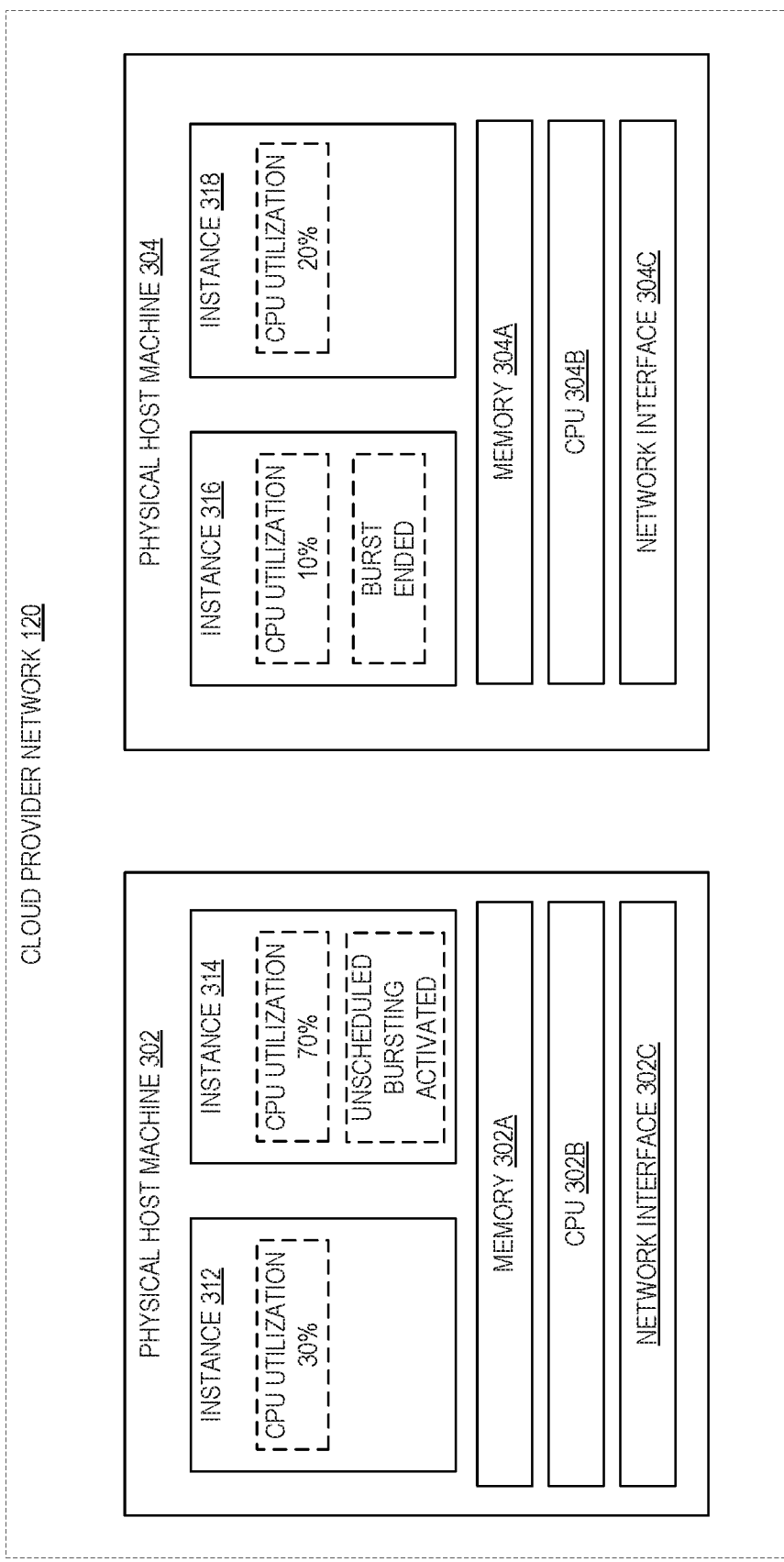
FIG. 4 depicts a block diagram of an embodiment in which the virtual machine instance of FIG. 3 has finished bursting in accordance with aspects of the present disclosure.
Figure 5:
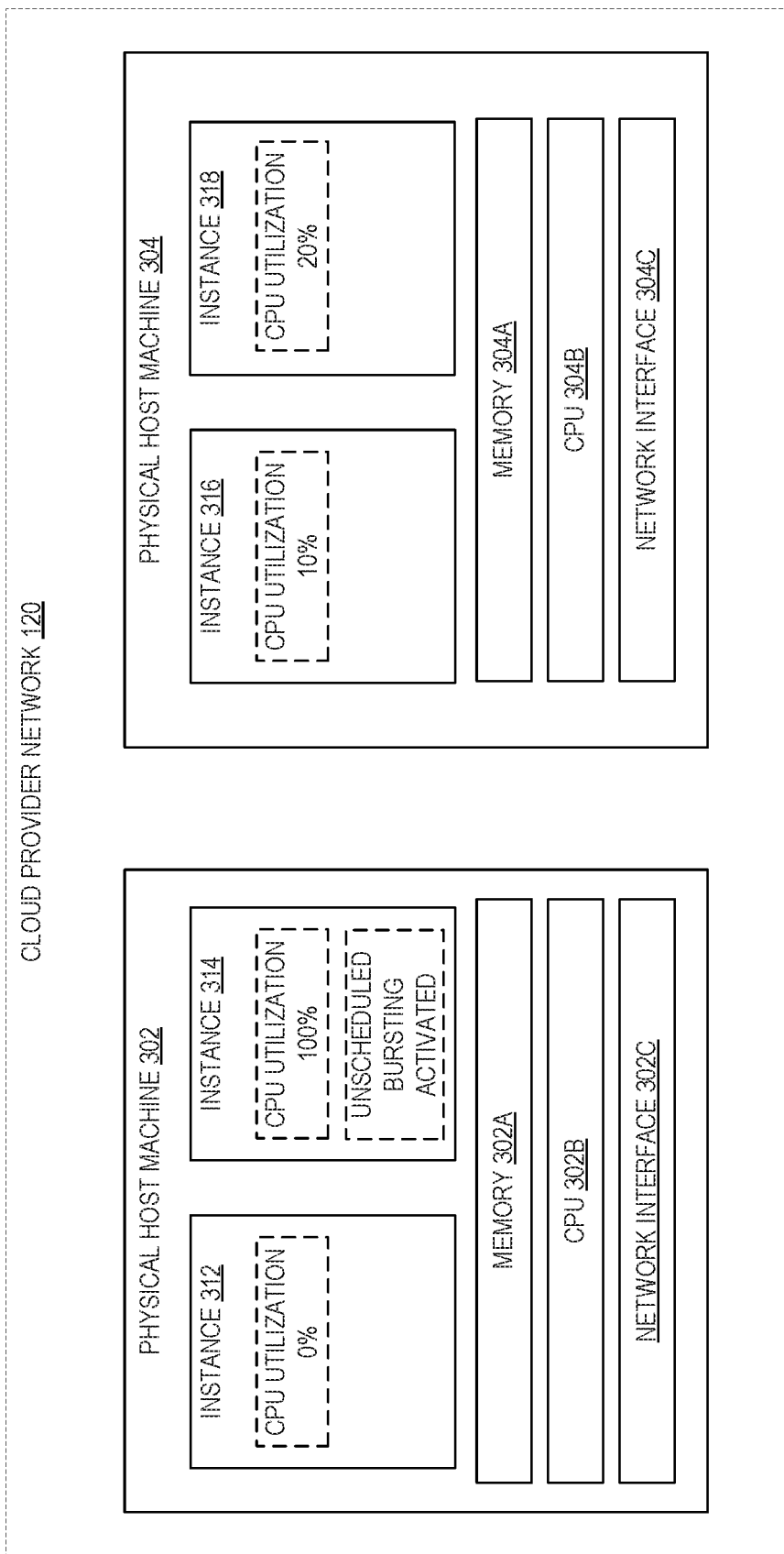
FIG. 5 depicts a block diagram of an embodiment in which another virtual machine instance is bursting without scheduling a burst period in accordance with aspects of the present disclosure.

FIGS. 2-5 depict example configurations of virtual machines hosted by physical host machines and the resources provided by the physical host machines. More specifically, FIG. 2 depicts a block diagram of an embodiment including a virtual machine for which a burst request has been received, FIG. 3 depicts a block diagram of an embodiment in which the virtual machine has been moved to a new physical host machine that can provide the resources necessary for the requested bursting, FIG. 4 depicts a block diagram of an embodiment in which the virtual machine has finished bursting on the new physical host machine, and another virtual machine is bursting without scheduling a burst period in advance, FIG. 5 depicts a block diagram of an embodiment in which a virtual machine's ability to burst without scheduling a burst period in advance changes due to the resource utilization levels of another virtual machine on the same physical host machine.

In the example of FIG. 2, the cloud provider network 120 includes a physical host machine 302 and a physical host machine 304. The physical host machine 302 includes instance 312, instance 314, and instance 316, which utilize the resources provided by the physical host machine 302: memory 302A, CPU 302B, and network interface 302C. The physical host machine 304 includes instance 318, which utilizes the resources provided by the physical host machine 304: memory 304A, CPU 304B, and network interface 304C. In the example of FIG. 2, the instance 312 is utilizing 30% of the CPU cycles provided by the CPU 302B, the instance 314 is utilizing 20% of the CPU cycles provided by the CPU 302B, and the instance 316 is utilizing 10% of the CPU cycles provided by the CPU 302B.

As shown in FIG. 2, a request to schedule a burst period during which the instance 316 is to burst to the 70% of the CPU cycles provided by the CPU 302B has been received. For example, during the week, the user of the instance 316 uses the instance 316 to run an application that is not very resource-intensive. However, on weekends, the user uses the instance 316 to run a resource-intensive update process that lasts for about an hour. In such a case, the user may submit a burst request to the instance resource oversubscription service 130, indicating that the user wishes to burst the user's instance 316 (e.g., to 70% of the CPU cycles provided on the physical host machine hosting the instance 316) for an hour any time between 12:00 am Saturday and 11:59 pm on Sunday.

In response, the instance resource oversubscription service 130 may determine that the physical host machine currently hosting the instance 316 (e.g., physical host machine 302) cannot provide the resources necessary for the bursting requested by the user during the specified time window, and may identify another physical host machine that is able to provide the necessary resources during the specified time window (e.g., physical host machine 304). In such a case, the instance resource oversubscription service 130 may move the instance 316 to the identified physical host machine at or before the time that the instance 316 is allowed to burst (e.g., during the burst period), as shown in FIG. 3.

In the example of FIG. 3, the cloud provider network 120 includes the physical host machines 302 and 304 of FIG. 2, and additionally, the instance 316 has been moved from the physical host machine 302 to the physical host machine 304. Before or after the instance 316 is moved to the physical host machine 304, the instance resource oversubscription service 130 may schedule the burst period. In the example above, the instance resource oversubscription service 130 may determine, based on the historical resource usage data and other burst requests scheduled or to be scheduled, that 3:30 pm-4:30 pm on Saturday would be ideal for this particular burst request and send a notification to the user that the burst period for instance 16 has been scheduled for that 1-hour period. As shown in FIG. 3, the instance 316 has begun bursting according to the scheduled burst period, and is using 70% of the CPU cycles provided by the CPU 304B. The instance 316 is able to do so because the only other instance on the physical host machine 304, the instance 318, is using only 20% of the CPU cycles provided by the CPU 304B, and thus the percentage of total CPU cycles used by the instances hosted by the physical host machine does not exceed 100%. In some embodiments, if the instance 318 tries to use more than 30% of the CPU cycles provided by the CPU 304B during the burst period scheduled for the instance 316, the cloud provider network 120 may throttle such attempts such that the resource usage (e.g., CPU cycles) by the instance 318 stays at or below 30% (e.g., total amount, 100%, minus the amount to be reserved for the instance 316, 70%)).

In the example of FIG. 4, the cloud provider network 120 includes the physical host machines 302 and 304 of FIG. 3, and additionally, the instance 316 has stopped bursting and its CPU cycle usage has dropped to 10%. Further, the instance 314 posted by the physical host machine 302 has begun bursting without scheduling a burst period in advance. As shown in FIG. 4, the instance 314 is able to and is bursting at 70% of the CPU cycles provided by the CPU 302B, but the instance 314 cannot burst beyond that point because the other instance hosted by the physical host machine 302, the instance 312, is using 30% of the CPU cycles provided by the CPU 302B. However, as shown in FIG. 5, after the CPU utilization of the instance 312 has dropped to 0%, the instance 314 is able to burst to 100% CPU utilization. Thus, depending on the current utilization levels of the resources provided by the physical host machine hosting an instance, the instance's ability to burst may be limited or denied.

As illustrated in FIGS. 2-5, by allowing the users to specify a future time window during which they would like to burst (i.e., temporarily use a higher amount of computing resources such as CPU cycles) and therefore knowing when the users would burst in advance, the cloud provider network can plan ahead and better coordinate the demands of the virtual machines within the cloud provider network, thereby improving the likelihood that a given virtual machine will have access to the desired amount of computing resources at least during the burst period scheduled within the time window specified by the user.

Example Routine for Scheduling Burst Period for Virtual Machine

Figure 6:
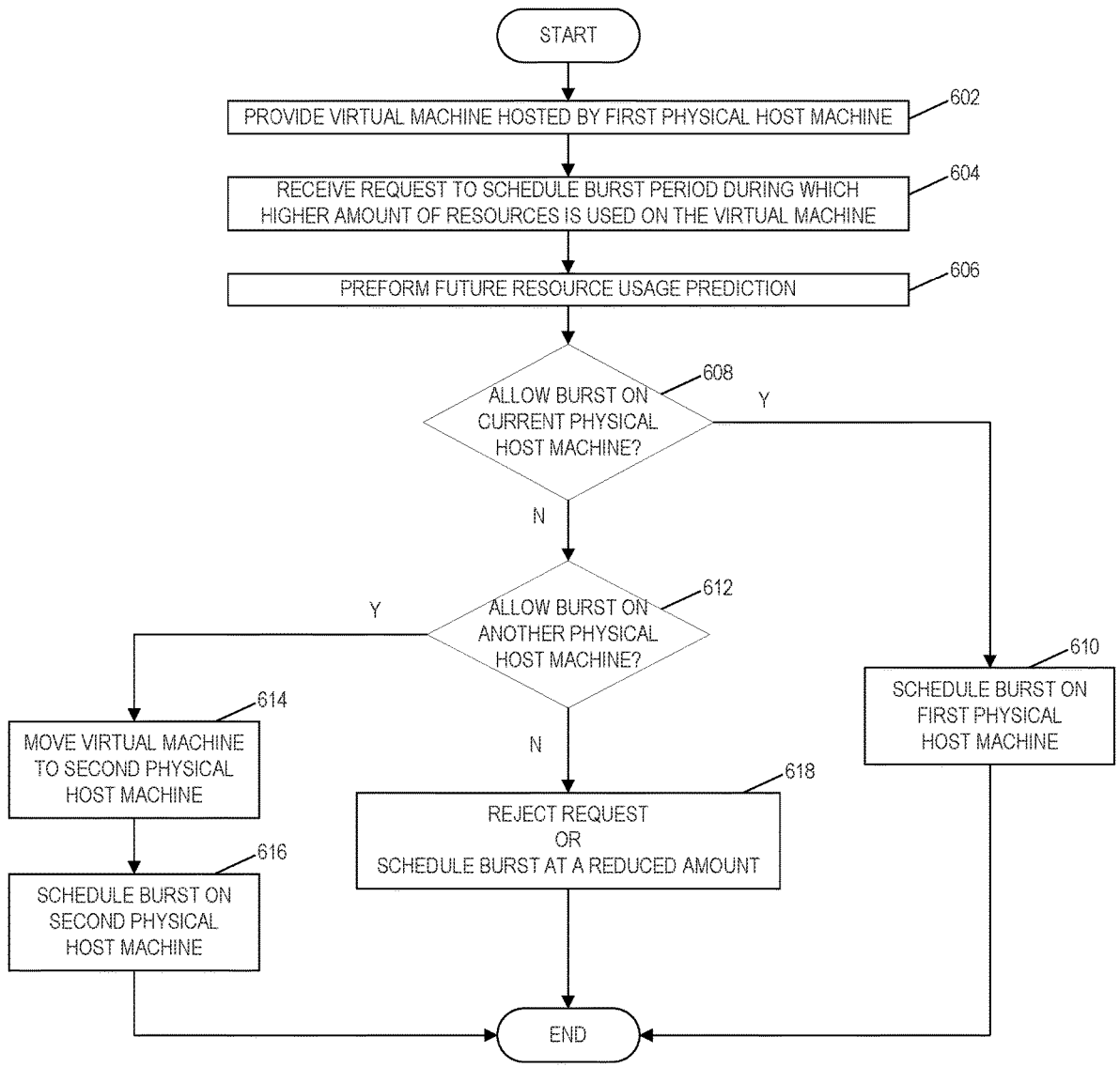
FIG. 6 is a flowchart of an example process for scheduling a burst period in accordance with aspects of the present disclosure.

FIG. 6 depicts an illustrative routine 600 for scheduling a burst period for a virtual machine in accordance with aspects of the present disclosure. The routine 600 may be carried out, for example, by the instance resource oversubscription service 130 or one or more other components of the cloud provider network 120 described herein, such as, for example, the compute servers 115. For convenience, some or all of the steps of the routine 600 are described as being performed by the instance resource oversubscription service 130. For example, the instance resource oversubscription service 130 may include one or more hardware computing devices and non-transitory physical computer storage storing instructions that, when executed by the one or more hardware computing devices, cause the one or more hardware computing devices to perform the steps of the routine 600.

The routine 600 begins at 602, where a virtual machine is provided by the first physical host machine. For example, the virtual machine may be allocated a finite amount/percentage of the resources available on the first physical host machine. For example, the virtual machine may be allocated 30% of the CPU cycles, 64 GB of memory, 300 GB of storage, and up to 10 Gbps of network bandwidth.

At block 604, the instance resource oversubscription service 130 receives a request to schedule a burst period during which a higher amount of resources is to be used on the virtual machine. The request may specify a duration for which the higher amount of resources is requested, and a time window that is greater than or equal to the duration. For example, the request may specify that a burst is requested for the virtual machine for 2 hours within a time window of 6:00 pm-11:00 pm next Sunday night, thereby giving the instance resource oversubscription service 130 the flexibility to schedule the 2-hour burst period at any time between specified time window (e.g., at 6:00 pm, at 7:30 pm, or at 9:00 pm). In some embodiments, the request specifies the amount of resources to be used or expected to be used by the virtual machine during the burst period. In other embodiments, the request does not specify the amount of resources to be used or expected to be used by the virtual machine during the burst period. In such embodiments, the instance resource oversubscription service 130 may assume a default amount (e.g., 100% of the resources provided by the physical host machine).

At block 606, the instance resource oversubscription service 130 performs a prediction of the future resource usage on the first physical host machine and any additional physical host machines that may be used to host the virtual machine. In some embodiments, the instance resource oversubscription service 130 performs the prediction using historical resource usage data. Such historical resource usage data may be maintained and updated by the instance resource oversubscription service 130 or another service/component in communication with the instance resource oversubscription service 130, and may include resource usage of one or more virtual machines hosted by the first physical host machine and any other virtual machines hosted by other physical host machines within the cloud provider network over time. Additionally, the instance resource oversubscription service 130 may perform the prediction using the other requests to schedule burst periods received by the instance resource oversubscription service 130 (e.g., burst periods requested and already scheduled, and burst periods requested but not yet scheduled), also collectively referred to herein as burst request data. For example, using such requests and historical resource usage data, the instance resource oversubscription service 130 can predict whether a given physical host machine will have the resources necessary for the bursting requested at block 604 during the time window specified by the request received at block 604.

At block 608, the instance resource oversubscription service 130 determines whether to allow the requested burst period to be scheduled on the first physical host machine hosting the virtual machine. In some embodiments, the determination at block 608 is based on the historical resource usage data and/or the burst request data corresponding to the first physical host machine and no other physical host machines. In other embodiments, the determination at block 608 is based on the historical resource usage data and/or the burst request data corresponding to the first physical host machine as well as other physical host machines. For example, if the instance resource oversubscription service 130 determines that the first physical host machine will not have the necessary resources available to allow the virtual machine to burst during a two-hour period within the time window (e.g., with or without throttling the resource usage by other instances on the first physical host machine), or if the instance resource oversubscription service 130 determines that the bursting should happen on another physical host machine for other reasons (e.g., to make room on the first physical host machine for other virtual machines), the routine 600 proceeds to block 610, where the instance resource oversubscription service 130 schedules the request burst on the first physical host machine. Otherwise, the routine 600 proceeds to block 612.

At block 610, the instance resource oversubscription service 130 determines whether to allow the requested burst period to be scheduled on another physical host machine (e.g., other than the first physical host machine hosting the virtual machine). In some embodiments, the determination at block 610 is based on the historical resource usage data and/or the burst request data corresponding to physical host machines other than the first physical host machine. In other embodiments, the determination at block 610 is based on the historical resource usage data and/or the burst request data corresponding to the first physical host machine as well as other physical host machines. For example, if the instance resource oversubscription service 130 can identify another physical host machine that will or is likely to have the necessary resources available to allow the virtual machine to burst during a two-hour period within the time window (e.g., with or without throttling the resource usage by other instances on the new physical host machine), the routine 600 may proceed to block 614. Otherwise, the routine 600 may proceed to block 618, where the instance resource oversubscription service 130 rejects the request received at block 604 or schedules the requested burst at a reduced amount (e.g., at 50% even though 100% was requested at block 604).

At block 614, the instance resource oversubscription service 130 causes the virtual machine to be moved to a second physical host machine determined to have or is likely to have the necessary resources available to allow the virtual machine to burst during a two-hour period within the time window, and at block 616, schedules the burst period on the second physical host machine for a 2-hour duration within the time window specified by the request received at block 604. The routine 600 may then end.

The method 600 can include fewer, more, or different blocks than those illustrated in FIG. 6 and/or one or more blocks illustrated in FIG. 6 may be modified, omitted, or switched without departing from the spirit and scope of the description. For example, although not illustrated in FIG. 6, the instance resource oversubscription service 130 may output a notification to the user (e.g., via the user computing device 102), indicating that the requested burst period has been scheduled. In some embodiments, the user computing device 102 may be configured to provide instructions the virtual machine to burst during the scheduled burst period (e.g., by executing program codes and/or generating and storing data) in response to such a notification from the instance resource oversubscription service 130. Moreover, it will be appreciated by those skilled in the art and others that some or all of the functions described in this disclosure may be embodied in software executed by one or more processors of the cloud provider network 120 and/or the user computing device 102 disclosed herein.

Example Architecture of Instance Resource Oversubscription Service

Figure 7:
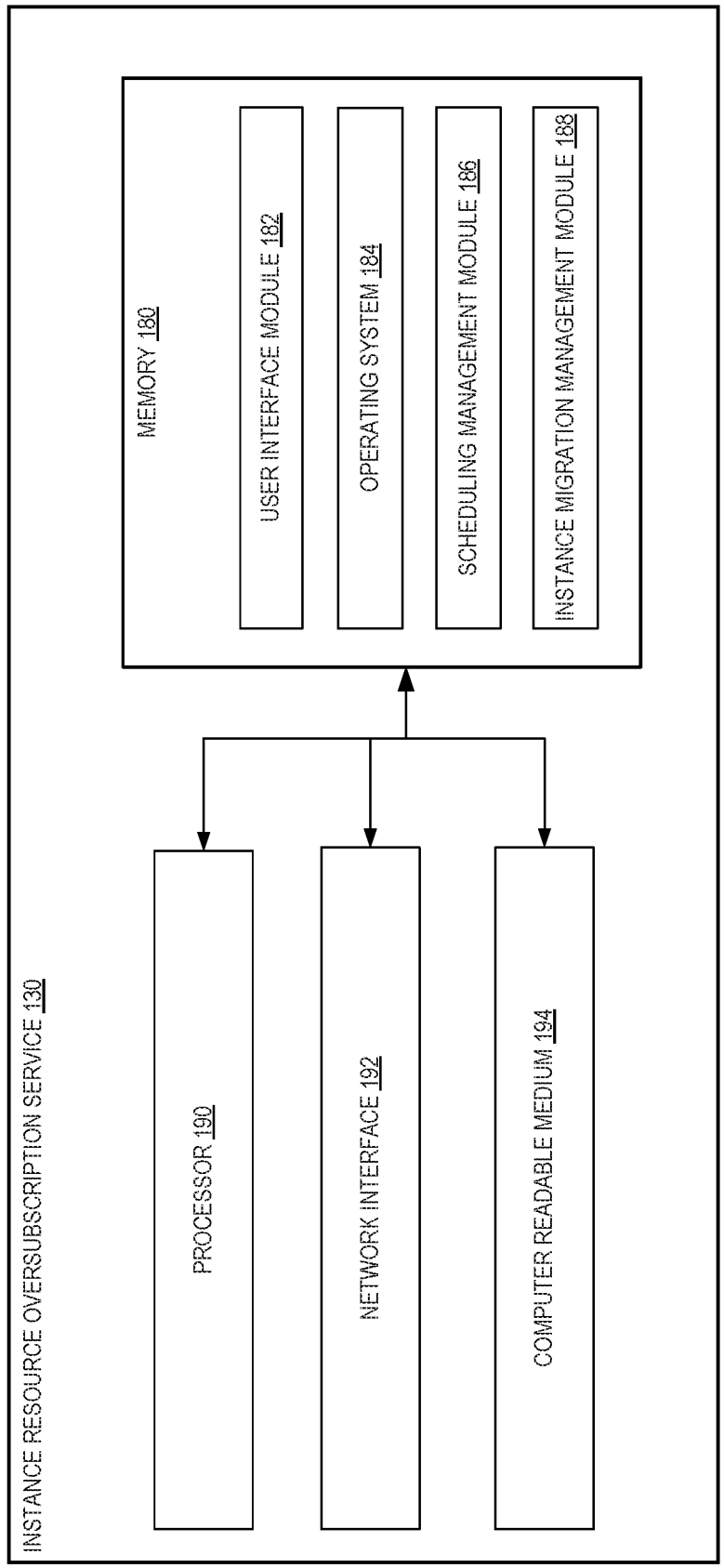
FIG. 7 depicts a general architecture of a computing device or system providing an instance resource oversubscription service in accordance with aspects of the present disclosure.

FIG. 7 depicts an example architecture of a computing system (referred to as the instance resource oversubscription service 130) that can be used to perform one or more of the techniques described herein or illustrated in FIGS. 1-6. The general architecture of the instance resource oversubscription service 130 depicted in FIG. 7 includes an arrangement of computer hardware and software modules that may be used to implement one or more aspects of the present disclosure. The instance resource oversubscription service 130 may include many more (or fewer) elements than those shown in FIG. 7. It is not necessary, however, that all of these elements be shown in order to provide an enabling disclosure. As illustrated, the instance resource oversubscription service 130 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 184 that provides computer program instructions for use by the processor 190 in the general administration and operation of the instance resource oversubscription service 130. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores.

In addition to and/or in combination with the user interface module 182, the memory 180 may include a scheduling management module 186 and an instance migration management module 188 that may be executed by the processor 190. In one embodiment, the scheduling management module 186 and the instance migration management module 188 individually or collectively implement various aspects of the present disclosure, e.g., receiving a request to schedule a burst period within a time window, determining the predicted resource usage during the time window, migrating the instance to a different physical host machine, scheduling the burst period within the time window, outputting a notification to the user regarding the scheduled burst period, and/or other aspects discussed herein or illustrated in FIGS. 1-7.

While the scheduling management module 186 and the instance migration management module 188 are shown in FIG. 7 as part of the instance resource oversubscription service 130, in other embodiments, all or a portion of the scheduling management module 186 and the instance migration management module 188 may be implemented by other components of the cloud provider network 120 and/or another computing device. For example, in certain embodiments of the present disclosure, another computing device in communication with the cloud provider network 120 may include several modules or components that operate similarly to the modules and components illustrated as part of the instance resource oversubscription service 130. It will also be appreciated that, in some embodiments, a user computing device (e.g., the user computing device 102 of FIG. 1) may implement functionality that is otherwise described herein as being implemented by the elements and/or modules of the instance resource oversubscription service 130. For example, the user computing device 102 may receive code modules or other instructions from the instance resource oversubscription service 130 and/or other components of the cloud provider network 120 via the network 104 that are executed by the user computing device 102 to implement various aspects of the present disclosure.

Other Considerations

Although in some embodiments, CPU cycles is used as an example of the computing resources to which the techniques described herein can be applied, in other embodiments, such techniques can be applied to other types of computing resources such as memory, disk, local storage, remote storage, network resources, and/or other virtual or physical resources.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A cloud provider system comprising:
a plurality of physical host machines hosting a plurality of virtual machine instances; and
an instance resource oversubscription service comprising computer hardware, wherein the instance resource oversubscription service is configured to:
provide a first virtual machine instance configured to execute one or more tasks on behalf of a user, wherein the first virtual machine instance is hosted on a first physical host machine of the plurality of physical host machines;
receive, from a user computing device, a burst request to schedule a burst period during which an additional amount of computing resources is to be made available for use by the first virtual machine instance, wherein the burst request specifies a time window within which the burst period is to be scheduled;
access historical resource usage data associated with one or more additional virtual machine instances hosted on the first physical host machine, wherein the historical resource usage data indicates resource usage on the one or more additional virtual machine instances over time;
determine predicted future resource usage data associated with the one or more additional virtual machine instances, wherein the predicted future resource usage data indicates an amount of computing resources expected to be used by the one or more additional virtual machine instances during the time window specified by the burst request;
determine, based at least on the predicted future resource usage data, that the burst period cannot be scheduled on the first physical host machine;
identify, based at least on additional historical resource usage data and additional predicted future resource usage data, a second physical host machine of the plurality of physical host machines that is usable to host the first virtual machine instance during the burst period;
move the first virtual machine instance from the first physical host machine to the second physical host machine such that the first virtual machine instance is no longer hosted by the first physical host machine; and
output, to the user computing device, an indication that the burst period is scheduled within the time window specified by the burst request.

2. The cloud provider system of claim 1, wherein the time window has a start time and an end time, and wherein the instance resource oversubscription service is further configured to schedule the burst period to be within the time window specified by the burst request and to begin at a time subsequent to the start time.

3. The cloud provider system of claim 1, wherein the additional historical resource usage data indicates resource usage on the second physical host machine over time, and wherein the additional predicted future resource usage data indicates an amount of computing resources expected to be used by one or more other virtual machine instances hosted by the second physical host machine during the time window specified by the burst request.

4. The cloud provider system of claim 1, wherein the instance resource oversubscription service is further configured to output, to the user computing device, an indication of an amount of computing resources allocated for use by the first virtual machine instance during the burst period.

5. A computer-implemented method, comprising:
providing a first virtual machine instance hosted on a first physical host machine of a plurality of physical host machines, wherein the first physical host machine is configured to provide computing resources for use by the first virtual machine instance;
receiving a request to schedule a burst period during which an additional amount of computing resources is to be made available for use by the first virtual machine instance, wherein the request specifies a temporal condition for scheduling the burst period;
accessing historical resource usage data associated with one or more additional virtual machine instances hosted on the first physical host machine, wherein the historical resource usage data indicates resource usage on the one or more additional virtual machine instances over time;
determining predicted future resource usage data associated with the one or more additional virtual machine instances, wherein the predicted future resource usage data indicates an amount of computing resources expected to be used by the one or more additional virtual machine instances during a time window satisfying the temporal condition specified by the request;
determining, based at least on the predicted future resource usage data, that the burst period cannot be scheduled on the first physical host machine;
identifying, based at least on historical resource usage data associated with the plurality of physical host machines, a second physical host machine usable to host the first virtual machine instance during the burst period;
moving the first virtual machine instance from the first physical host machine to the second physical host machine such that the first virtual machine instance is no longer hosted by the first physical host machine; and
outputting an indication that the burst period is scheduled in a manner that satisfies the temporal condition specified by the request.

6. The computer-implemented method of claim 5, wherein the temporal condition includes a start time at or after which the burst period is to begin, and wherein the computer-implemented method further comprises scheduling the burst period such that the burst period begins after the start time.

7. The computer-implemented method of claim 5, wherein the temporal condition includes an end time at or before which the burst period is to end, and wherein the computer-implemented method further comprises scheduling the burst period such that the burst period ends before the end time.

8. The computer-implemented method of claim 5, further comprising outputting an indication of a time at which the additional amount of computing resources is available for use by the first virtual machine instance.

9. The computer-implemented method of claim 5, further comprising outputting an indication of one or both of (i) a duration of the burst period is less than a duration indicated by the request, or (ii) an amount of computing resources allocated for use by the first virtual machine instance during the burst period, wherein the amount of computing resources is less than an amount indicated by the request.

10. The computer-implemented method of claim 5, further comprising throttling resource usage by one or more other virtual machine instances hosted by the second physical host machine such that the resource usage does not exceed a threshold level during the burst period.

11. The computer-implemented method of claim 5, further comprising determining, based at least on historical resource usage data associated with one or more additional virtual machine instances hosted on the first physical host machine, predicted future resource usage data associated with the one or more additional virtual machine instances, wherein the predicted future resource usage data indicates an amount of computing resources expected to be used by the one or more additional virtual machine instances during a time period that satisfies the temporal condition specified by the request.

12. The computer-implemented method of claim 11, further comprising determining, based at least on the predicted future resource usage data, that the additional amount of computing resources is unlikely to be available for use by the first virtual machine instance without throttling resource usage by the one or more additional virtual machine instances.

13. A non-transitory computer-readable medium storing instructions that, when executed by a computing system, cause the computing system to perform operations comprising:
providing a first virtual machine instance hosted on a first physical host machine of a plurality of physical host machines, wherein the first physical host machine is configured to provide computing resources for use by the first virtual machine instance;
receiving a request to schedule a burst period during which an additional amount of computing resources is to be made available for use by the first virtual machine instance, wherein the request specifies a temporal condition for scheduling the burst period;
accessing historical resource usage data associated with one or more additional virtual machine instances hosted on the first physical host machine, wherein the historical resource usage data indicates resource usage on the one or more additional virtual machine instances over time;
determining predicted future resource usage data associated with the one or more additional virtual machine instances, wherein the predicted future resource usage data indicates an amount of computing resources expected to be used by the one or more additional virtual machine instances during a time window satisfying the temporal condition specified by the request;
determining, based at least on the predicted future resource usage data, that the burst period cannot be scheduled on the first physical host machine;

identifying, based at least on historical resource usage data associated with the plurality of physical host machines, a second physical host machine usable to host the first virtual machine instance during the burst period;

moving the first virtual machine instance from the first physical host machine to the second physical host machine such that the first virtual machine instance is no longer hosted by the first physical host machine; and outputting an indication that the burst period is scheduled in a manner that satisfies the temporal condition specified by the request.

14. The non-transitory computer-readable medium of claim 13, wherein the temporal condition includes a start time at or after which the burst period is to begin, and wherein the operations further comprise scheduling the burst period such that the burst period begins after the start time.

15. The non-transitory computer-readable medium of claim 13, wherein the temporal condition includes an end time at or before which the burst period is to end, and wherein the operations further comprise scheduling the burst period such that the burst period ends before the end time.

16. The non-transitory computer-readable medium of claim 13, wherein the operations further comprise outputting an indication of a time at which the additional amount of computing resources is available for use by the first virtual machine instance.

17. The non-transitory computer-readable medium of claim 13, wherein the operations further comprise outputting an indication of one or both of (i) a duration of the burst period is less than a duration indicated by the request, or (ii) an amount of computing resources allocated for use by the first virtual machine instance during the burst period, wherein the amount of computing resources is less than an amount indicated by the request.

18. The non-transitory computer-readable medium of claim 13, wherein the operations further comprise throttling resource usage by one or more other virtual machine instances hosted by the second physical host machine such that the resource usage does not exceed a threshold level during the burst period.

19. The non-transitory computer-readable medium of claim 15, wherein the operations further comprise determining, based at least on historical resource usage data associated with one or more additional virtual machine instances hosted on the first physical host machine, predicted future resource usage data associated with the one or more additional virtual machine instances, wherein the predicted future resource usage data indicates an amount of computing resources expected to be used by the one or more additional virtual machine instances during a time period that satisfies the temporal condition specified by the request.

20. The non-transitory computer-readable medium of claim 19, wherein the operations further comprise determining, based at least on the predicted future resource usage data, that the additional amount of computing resources is unlikely to be available for use by the first virtual machine instance without throttling resource usage by the one or more additional virtual machine instances.

* * * * *